US011907111B2

(12) United States Patent
Zhong

(10) Patent No.: US 11,907,111 B2
(45) Date of Patent: Feb. 20, 2024

(54) DATABASE TROUBLESHOOTING WITH AUTOMATED FUNCTIONALITY

(71) Applicant: SAP SE, Walldorf (DE)

(72) Inventor: Mingqian Zhong, St-Leon Rot (DE)

(73) Assignee: SAP SE, Walldorf (DE)

( * ) Notice: Subject to any disclaimer, the term of this patent is extended or adjusted under 35 U.S.C. 154(b) by 400 days.

(21) Appl. No.: 17/473,869

(22) Filed: Sep. 13, 2021

(65) Prior Publication Data

US 2023/0077577 A1 Mar. 16, 2023

(51) Int. Cl.
G06F 11/00 (2006.01)
G06F 11/36 (2006.01)
G06F 9/451 (2018.01)
G06F 16/25 (2019.01)

(52) U.S. Cl.
CPC .......... *G06F 11/3688* (2013.01); *G06F 9/451* (2018.02); *G06F 16/252* (2019.01)

(58) Field of Classification Search
CPC ............. G06F 11/3688; G06F 11/3466; G06F 11/3452; G06F 11/3409
See application file for complete search history.

(56) References Cited

U.S. PATENT DOCUMENTS

| 7,136,868 | B2 * | 11/2006 | Sonkin | G06F 16/284 |
| | | | | 707/999.102 |
| 10,466,981 | B1 | 11/2019 | MacMillan et al. | |
| 2011/0016453 | A1 * | 1/2011 | Grechanik | G06F 11/368 |
| | | | | 717/125 |
| 2015/0019497 | A1 | 1/2015 | Bostock | |
| 2020/0319995 | A1 * | 10/2020 | Mitra | G06F 16/958 |

FOREIGN PATENT DOCUMENTS

KR 20040027270 4/2004
WO WO2020/015116 1/2020

OTHER PUBLICATIONS

Extended European Search Report for European Application No. 22193047.2, dated Feb. 28, 2023.

* cited by examiner

*Primary Examiner* — Charles Ehne
(74) *Attorney, Agent, or Firm* — Klarquist Sparkman, LLP

(57) ABSTRACT

Technologies are described for establishing a connection to an IMDB (in-memory database) via a GUI, automatically detecting an IMDB version, and selecting at least one script from a plurality of scripts based on the detected IMDB version. Differences among the plurality of scripts can relate to data parameter differences in different IMDB versions. The selected at least one script to be executed returns data of a type recognized in the detected IMDB version.

20 Claims, 5 Drawing Sheets

DATABASE TROUBLESHOOTING WITH AUTOMATED FUNCTIONALITY

BACKGROUND

Modern databases, which include in-memory columnar databases (IMDBs), require troubleshooting to ensure that they are operating effectively. Some problems that are regularly encountered are observed and diagnosed using diagnostic measurements from the database relating to length of time for processes to be completed and/or the amount of memory consumed by processes, as two examples.

Advanced database troubleshooting can be time-consuming and subject to inaccuracies. In conventional approaches, the troubleshooter must manage connecting to the database, selecting diagnostic operations appropriate for the specific database, and then carrying out repeated steps in sequence before any useful diagnostic output(s) can be achieved.

DETAILED DESCRIPTION

Overview

The following description is directed to technologies for improving troubleshooting, particularly in databases, including IMDBs and other similar environments.

According to one such technology, a software tool can automatically connect to an IMDB via a graphical user interface (GUI), run a script in the IMDB and return the results to the tool. The process can be repeated as desired to run additional scripts and return the respective results of those scripts, such as for troubleshooting and other objectives.

According to another technology, a software tool can automatically detect a version of an IMDB (also referred to as an "IDB version"), select a script based on the detected IMDB version and run the selected script. Scripts that are specific to different IMDB versions can include, for example, scripts that relate to data types specific to one or more IMDB versions.

According to yet another technology, two or more initial scripts can be automatically run in parallel, and the output of the two or more initial scripts can be used to modify a subsequent script(s), such that the subsequent script(s) are chained together with the initial scripts. The resulting output can be used for various purposes, including for presenting a visualization to a user to assist in troubleshooting. In some examples, the tool includes data interactive visualization capabilities such as can be achieved with Plotly or other similar graphing libraries.

EXAMPLE—AUTOMATED CONNECTION TO AN IMDB

Figure 1:
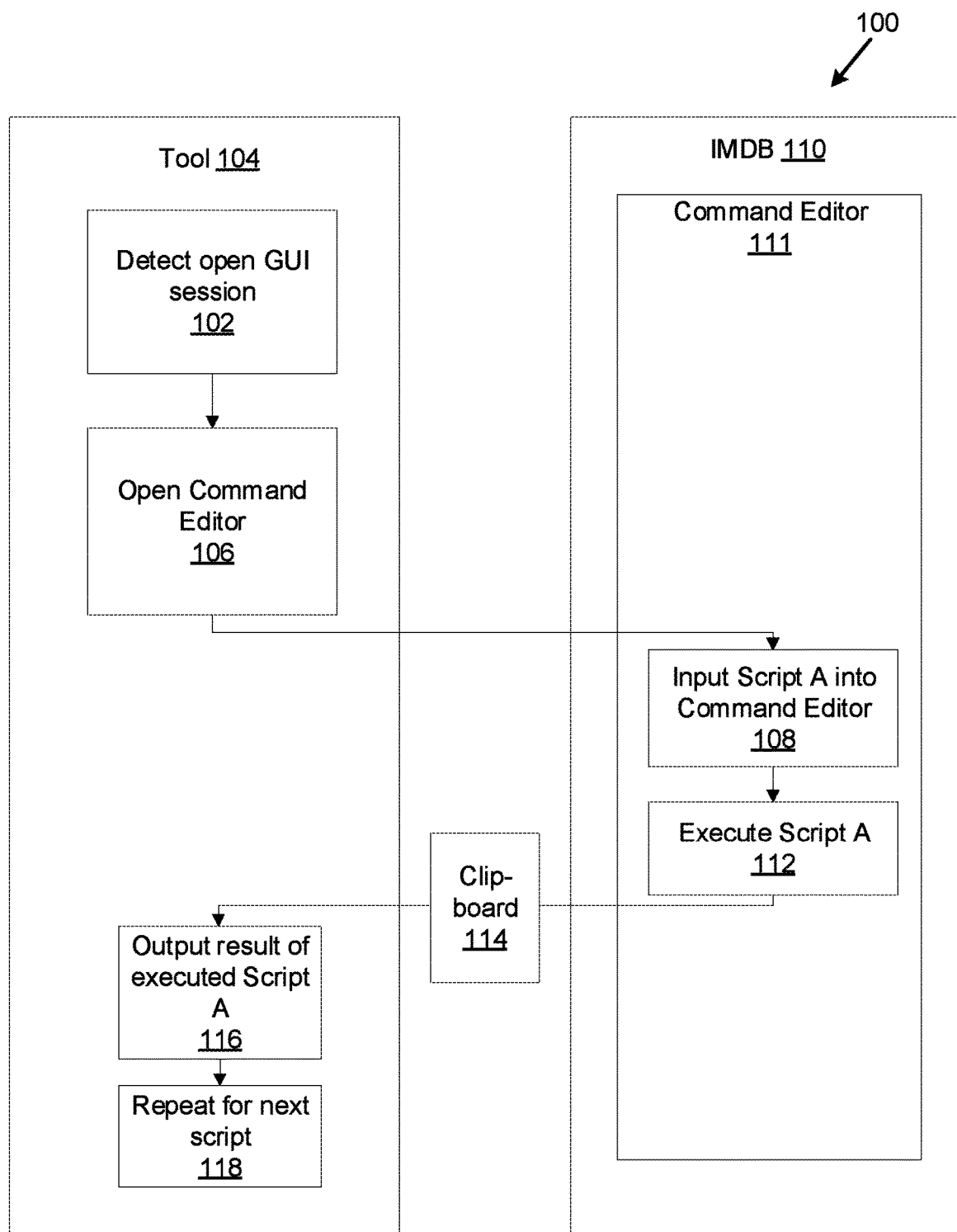
FIG. 1 is a flowchart of an example automated process for a software tool to automatically connect to a database, which also depicts the software tool and the database schematically.

In FIG. 1, an environment 100 is illustrated having a software tool or application 104 and an IMDB 110, depicted schematically, with which the tool 104 interacts. As shown at step (or block) 102, the tool 104 detects an open GUI session of the associated IMDB 110 and connects with the IMDB via the GUI session. At step 106, the tool 104 can then automatically open a command editor 111 of the IMDB (referred to in some implementations as a "cockpit"). At step 108, the tool then causes a script (e.g., Script A, which can be a SQL script or other suitable script) to be input into the command editor 111 and, at step 112, executes it. For example, in some implementations, the tool pastes the script into the command editor 111 and executes it with a series of commands that emulate the mouse and/or keyboard commands that a user would input manually.

As shown at step 116, the output or result of executing Script A has been returned to the tool 104. For example, in some implementations, the output of executing Script A is first copied to a clipboard 114, and then passed to the tool 104. As shown at step 118, the above steps can be repeated for additional scripts (e.g., Script B, Script C, Script D, etc.) until all desired scripts have been executed and their results have been returned to the tool.

The tool 104 may be implemented to use an API associated the IDB 110 to allow commands to be executed automatically and to at least reduce (and in some cases eliminate) the need for human attention once the process is initiated. As a result, a large number of scripts can be executed quickly, accurately and without interruption. In cases where the tool 104 is used for database troubleshooting, the user is freed from managing the running of many scripts in sequence to take on higher level tasks, such as, e.g., determining which checks are needed and analyzing the results of checks that have been completed.

EXAMPLE—AUTOMATED DETECTION OF IMDB ATTRIBUTE

Figure 2:
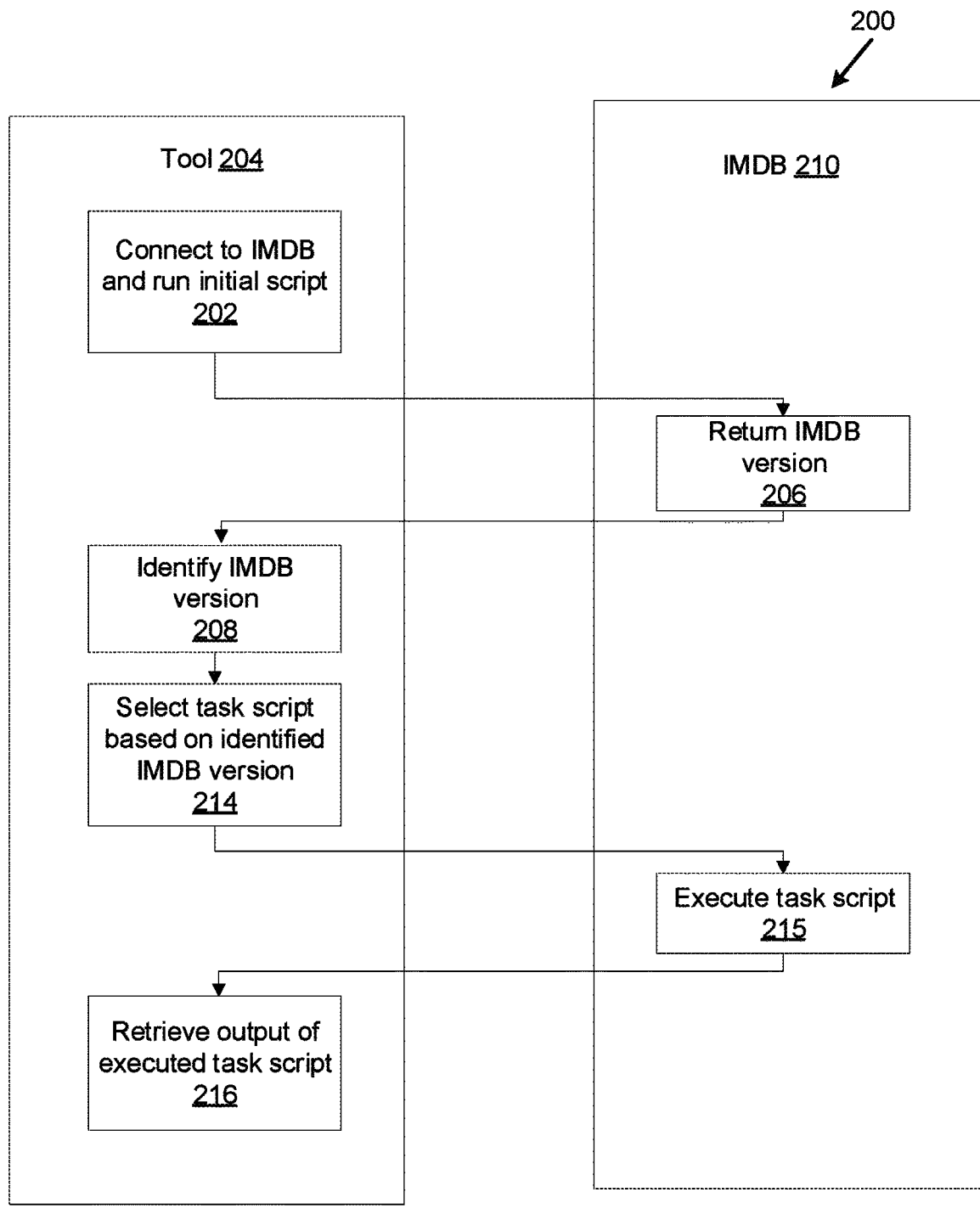
FIG. 2 is a flowchart of an example automated process by which a software tool connects to a database, determines a database version and runs scripts based on the database version.

In FIG. 2, an environment 200 is illustrated having a software tool 204 and an IMDB 210 linked or connected to the tool 204. At step 202, the tool 204 connects to the IMDB 210 and causes an initial script to run to identify or determine an attribute of the TIDB in an automated way (or automatically). For example, the attribute of the IMDB can be a version of the IMDB (or IMDB version), which is returned to the tool in response to running the initial script, as shown in step 206.

In step 208, the tool 204 can identify the IMDB version returned from the IMDB among potentially multiple different IMDB versions with which the tool can be used. In subsequent operations, the tool 204 automatically selects operations that can be completed with respect to identified IMDB version. For example, in step 214, the user can select an operation, such as, e.g., a diagnostic task, and the tool will automatically select an appropriate task script according to the identified IMDB version from a set of multiple task scripts corresponding to different IMDB versions. The selected task script is executed at step 215, and the output from the selected task script is retrieved at step 216.

For example, if large object (LOB) information is sought from an IMDB that treats or stores the LOB information differently according to the specific IMDB version, then identifying or determining the IMDB version ensures that subsequent operations are appropriate. In this example, the initial script in step 202 is an SQL script as follows: "SELECT VERSION FROM M_DATABASE." One sample output from running the initial script is:

```
-------------
| VERSION |
-------------
| 2.00.030.00 |
-------------
``` which indicates that the IMDB version is 2.00.030.00.

In the example, the "task" is retrieving LOB information, and there are three task scripts used to do so from multiple different IMDB versions of interest. The three task scripts are:

(1) ZMQ_LOBInfo_1.00.120+.txt
(2) ZMQ_LOBInfo_2.00.000+.txt
(3) ZMQ_LOBInfo_2.00.040+.txt In the example, the tool 204 then captures at least the "030" suffix of the IMDB version and compares it with the IMDB version returned from the initial script. In this example, the '030' suffix indicates the revision (or revision number) of the main version of the database.

In other examples, other parameters of the complete IMDB version information may be used instead of or in addition to the revision number, such as a main database version ("1" or "2"), a next field ("00") appearing between the main database version and the revision number (which is currently reserved), a maintenance revision field (not shown) and/or other similar parameters.

The tool determines that the second task script, i.e., "(2) ZMQ_LOBInfo_2.00.000+.txt" should be used to execute the task on a IMDB version 2.00.030 because 2.00.030 is above the starting value for that script (i.e., 2.00.000), and below the starting value for task script (3), i.e., 2.00.040.

In this way, the second task script allows appropriate LOB information to be retrieved from the IMDB having the IMDB version of 2.00.030. For example, commands relating to LOB appropriate to version 2.00.030, such as available data types, their locations and other similar parameters, will return meaningful results because the task script is matched to the IMDB version capabilities and characteristics. As examples, a column called "LOB_STORAGE_TYPE" may be available only in IMDB version 2.00.000 and above, and the column called "MEMORY_SIZE" may be available only in IDB version 2.00.040 and above.

In some implementations, the automated detection of a database attribute (e.g., FIG. 2) follows the automated connection to the IMDB (e.g., FIG. 1).

EXAMPLE—AUTOMATED RETRIEVAL OF DATABASE DIAGNOSTIC PARAMETERS FROM DIFFERENT DATABASE VIEWS

Figure 3:
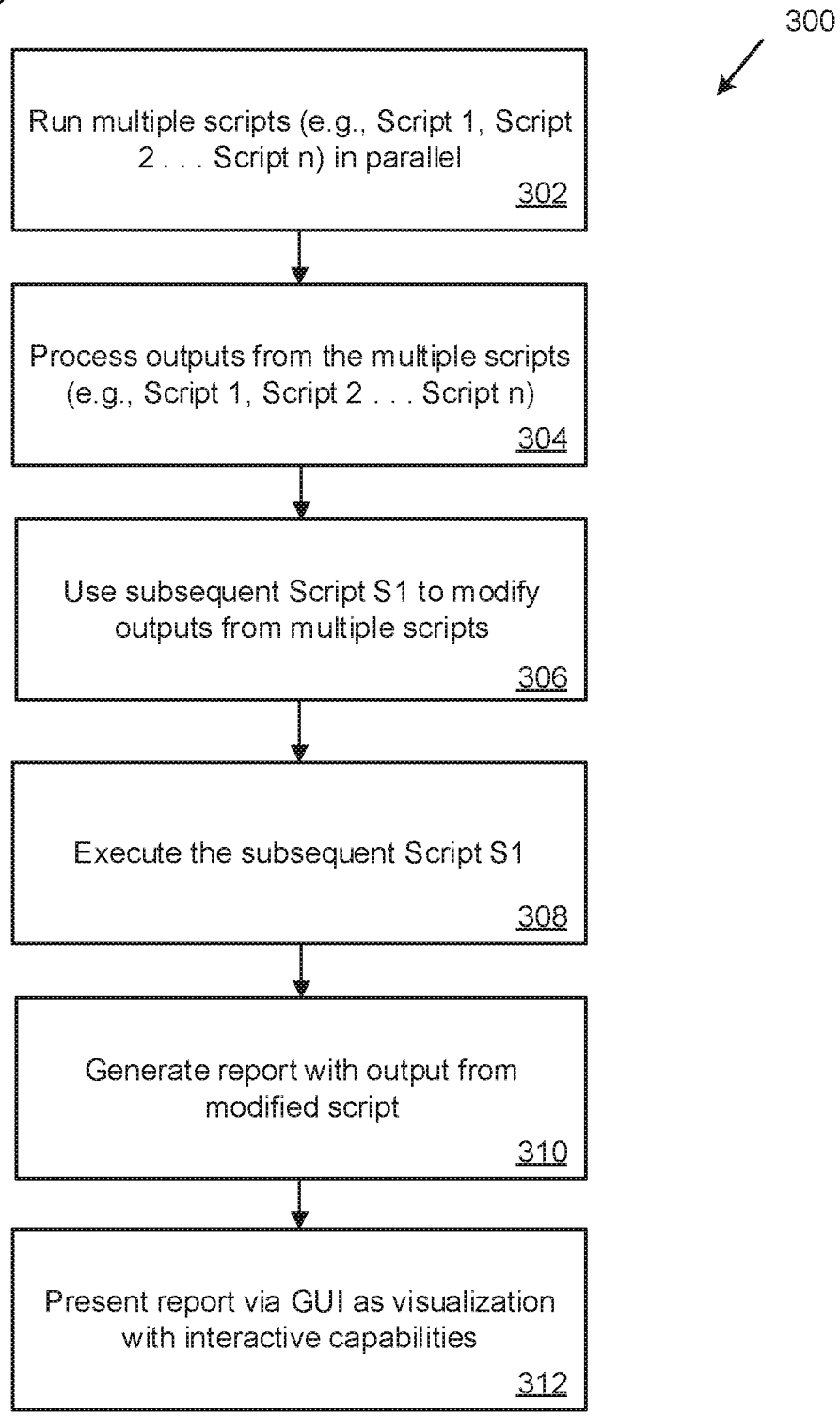
FIG. 3 is a flowchart of an example automated process by which data from established database views are processed together to generate a diagnostic parameter not represented in the database and outputted for visualization by a user.

In FIG. 3, an automated process 300 is carried out with a software tool in a database environment to provide desired database diagnostic results automatically based on data from multiple different database views. The desired database diagnostic results can be tailored for visualization through a GUI, such as by a user performing troubleshooting, using interactive graphics presentation features.

In step 302, multiple scripts, including at least Script 1 and Script 2, are run in parallel. Each of the multiple scripts is a script to obtain data from an established database view, and thus can be carried out as a single step in a relatively straightforward way and in parallel with the others. In step 304, the output from the multiple scripts is processed. In step 306, a subsequent script, Script S1, that modifies or uses the output from at least two of the multiple scripts (e.g., Script 1 and Script 2) is formulated and run (step 308). In step 310, a report with output from the subsequent script S1 is generated and presented to a user via the GUI (step 312).

Figure 4:
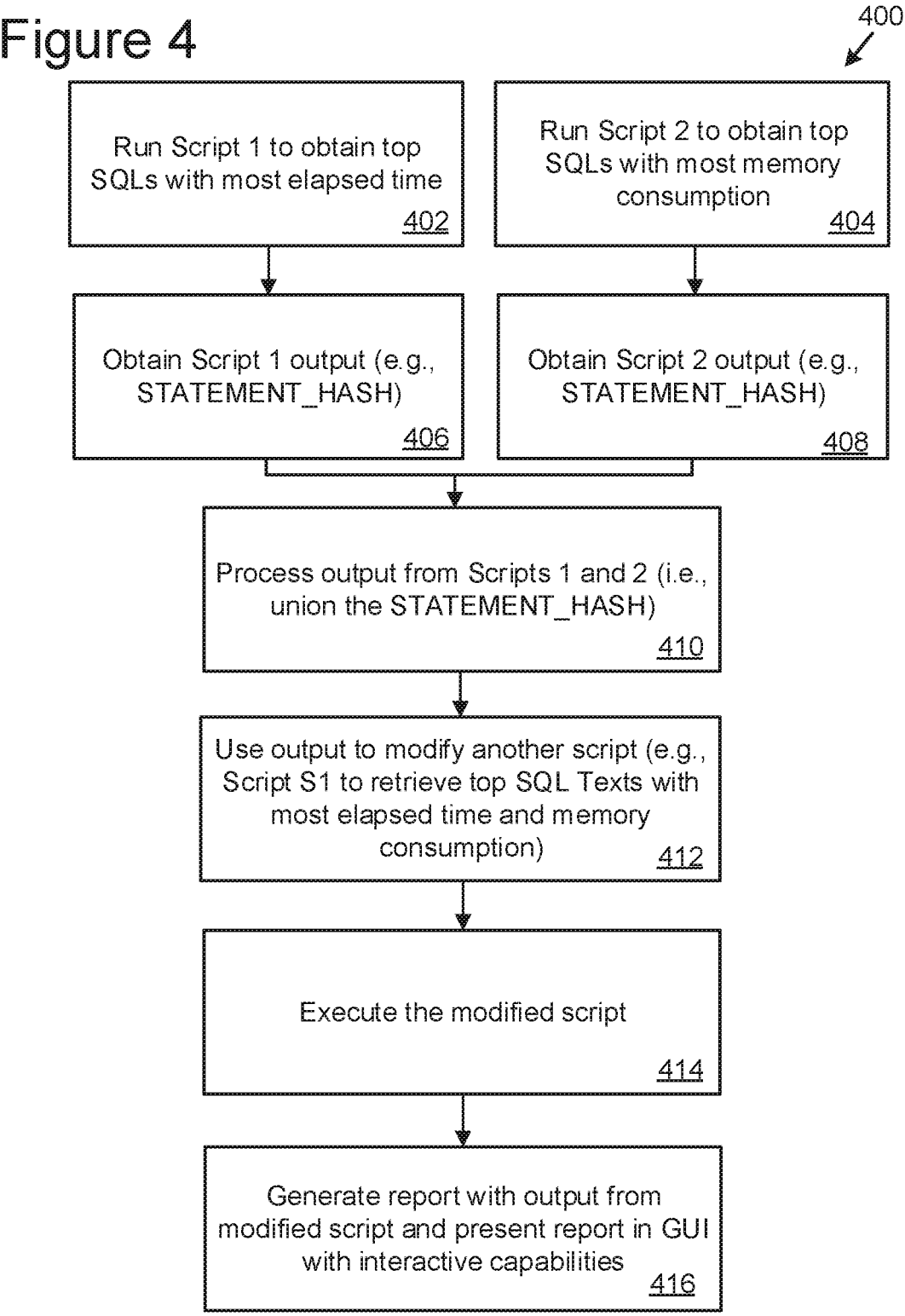
FIG. 4 is a flowchart of another automated example similar to FIG. 3.

A further example is illustrated in FIG. 4. In FIG. 4, an automated process 400 is carried out with a software tool in a database environment as in FIG. 3. At step 402, a first script, i.e., Script 1, is run to obtain data from an established database view, which, for purposes of this example is the "Top SQLs with most elapsed time," which can be a helpful diagnostic parameter or measurement. Concurrently, at step 404, a second script, i.e., Script 2, is run to obtain the "Top SQLs with most memory consumption."

At step 406, the output of Script 1 is obtained, which in this example is formulated as a hash value used to uniquely define one SQL statement. At step 408, the output of Script 2 is similarly formulated as a hash statement. At step 410, the output from Script 1 and Script 2 is processed together. In the example, there is desire to view the "Top SQLs with most time elapsed and most memory consumption," but no database view exists for this diagnostic parameter. Therefore, the two individual parameters "Top SQLs with most elapsed time" and "Top SQLs with most memory consumption" are processed together to obtain the desired combined parameter. For example, the hash statement from step 406 and the hash statement from step 408 can be subjected to a union operation as shown in step 410.

Further, another script (also referred to herein as a subsequent script), i.e., Script S1, can be run subsequently (i.e., "chained" to the previous script(s)) as shown in step 412, to modify the output from step 410. For example, in step 412, the output can be modified by setting Script S1 to retrieve SQL texts from within the "Top SQLs with most elapsed time and most memory consumption" and executing it (step 414). The SQL texts extracted from the SQL statements can provide important diagnostic information and assist in identifying problems. In step 416, a report can be generated to allow the user to visualize the results interactively.

Computing Systems

Figure 5:
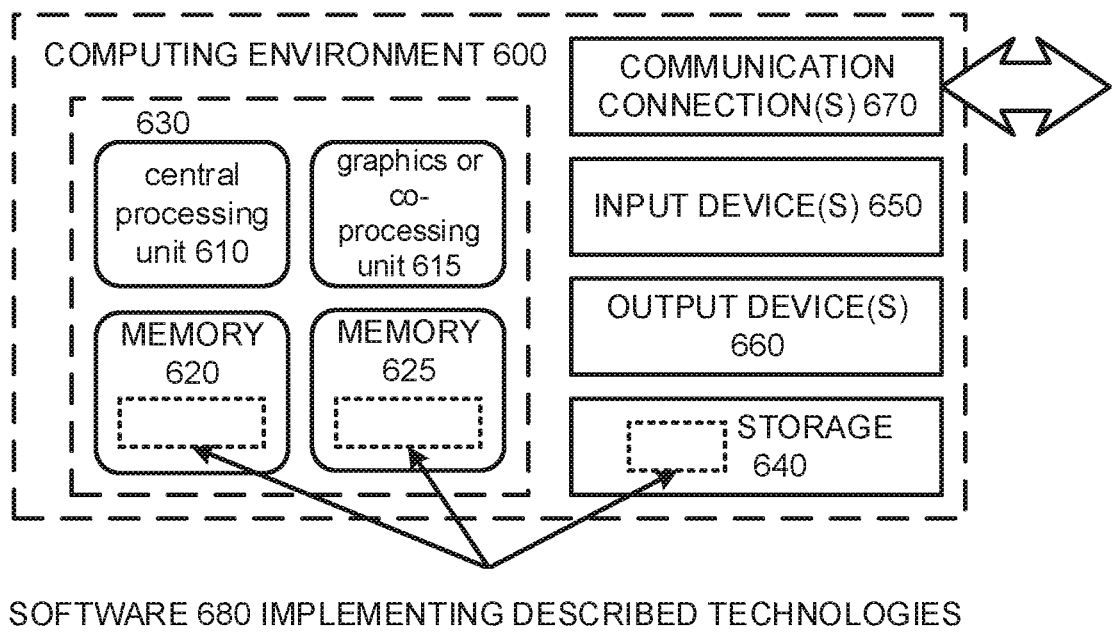
FIG. 5 is a diagram of an example computing system in which described embodiments can be implemented.

FIG. 5 depicts a generalized example of a suitable computing system 600 in which the described innovations may be implemented. The computing system 600 is not intended to suggest any limitation as to scope of use or functionality, as the innovations may be implemented in diverse general-purpose or special-purpose computing systems.

With reference to FIG. 5, the computing system 600 includes one or more processing units 610, 615 and memory 620, 625. In FIG. 5, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 5 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing system 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 6:
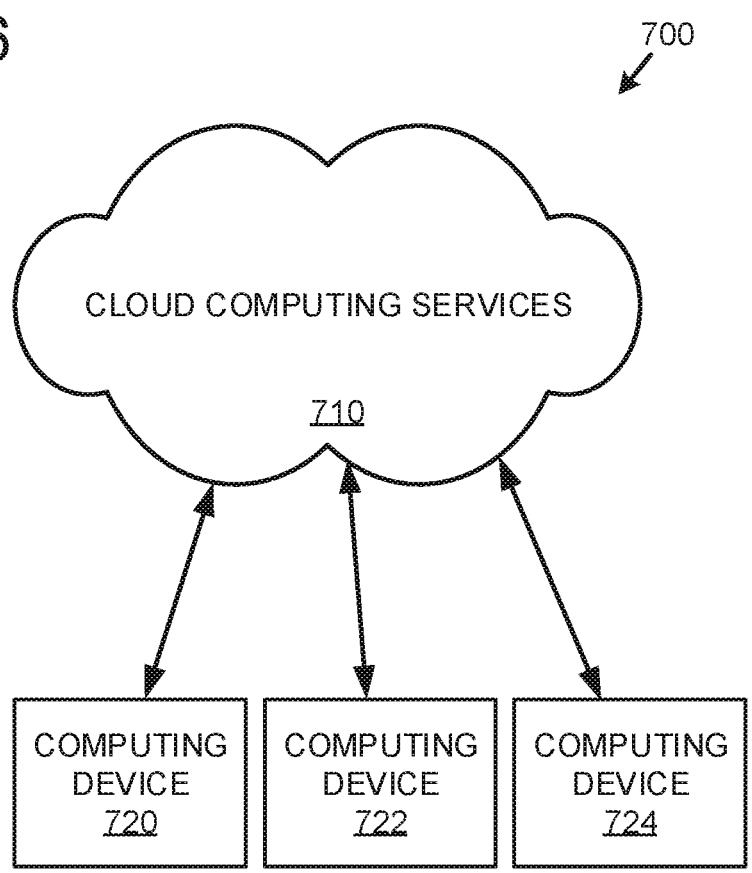
FIG. 6 is an example cloud computing environment that can be used in conjunction with the technologies described herein.

FIG. 6 depicts an example cloud computing environment 700 in which the described technologies can be implemented. The cloud computing environment 700 comprises cloud computing services 710. The cloud computing services 710 can comprise various types of cloud computing resources, such as computer servers, data storage repositories, database resources, networking resources, etc. The cloud computing services 710 can be centrally located (e.g., provided by a data center of a business or organization) or distributed (e.g., provided by various computing resources located at different locations, such as different data centers and/or located in different cities or countries).

The cloud computing services 710 are utilized by various types of computing devices (e.g., client computing devices), such as computing devices 720, 722, and 724. For example, the computing devices (e.g., 720, 722, and 724) can be computers (e.g., desktop or laptop computers), mobile devices (e.g., tablet computers or smart phones), or other types of computing devices. For example, the computing devices (e.g., 720, 722, and 724) can utilize the cloud computing services 710 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

I claim:

1. A system comprising:
   at least one data processor; and
   memory storing instructions which, when executed by the at least one data processor, result in operations comprising:
   establishing a connection to an IMDB (in-memory database) via a GUI (graphical user interface);
   automatically detecting an IMDB version;
   selecting at least one script from a plurality of scripts based on the detected IMDB version, wherein differences among the plurality of scripts relate to data parameter differences in different IMDB versions; and
   causing the selected at least one script to be executed to return data of a type recognized in the detected IMDB version.

2. The system of claim 1, wherein establishing a connection to the IMDB via the GUI comprises detecting an open GUI session and automatically opening a command editor.

3. The system of claim 2, further comprising causing the selected at least one script to be entered within the command editor.

4. The system of claim 2, further comprising causing the selected at least one script to be executed in the command editor.

5. The system of claim 4, further comprising causing the output of the selected at least one script executed in the command editor to be copied to a clipboard.

6. The system of claim 1, wherein establishing a connection to the IMDB comprises accessing the IMDB via a GUI-specific API.

7. The system of claim 1, further comprising:
   selecting at least first and second database diagnostic parameters from a plurality of database diagnostic parameters and causing respective first and second database diagnostic scripts to be run in parallel;
   processing the output of the first and second database diagnostic scripts together; and
   modifying at least a third database diagnostic script based on the output of the first and second database diagnostic script;
   executing the modified third database diagnostic script; and
   generating a report from the modified third database diagnostic script to be displayed via the GUI.

8. The system of claim 7, wherein the first and second database diagnostic parameters relate to different database views.

9. The system of claim 7, wherein the database diagnostic parameters comprise a top SQLs with most elapsed time parameter and a top SQLs with most memory consumption parameter.

10. The system of claim 9, wherein modifying the third database diagnostic script and executing the modified third database diagnostic script comprises determining SQL texts of top SQLs with most elapsed time and top SQLs most memory consumption.

11. A method for implementation by one or more data processors forming part of at least one computing device, the method comprising:
   establishing a connection to an IMDB (in-memory database) via a GUI (graphical user interface);
   automatically detecting an IMDB version of the IMDB;
   selecting at least one script from a plurality of scripts based on the detected IMDB version, wherein differences among the plurality of scripts relate to data parameter differences in different IMDB versions; and
   causing the selected at least one script to be executed to return data of a type recognized in the detected IMDB version.

12. The method of claim 11, wherein establishing a connection to the IMDB via the GUI comprises detecting an open GUI session and automatically opening a command editor.

13. The method of claim 11, further comprising causing the selected at least one script to be entered within the command editor.

14. The method of claim 12, further comprising causing the selected at least one script to be executed in the command editor.

15. The method of claim 14, further comprising causing the output of the selected at least one script executed in the command editor to be copied to a clipboard.

16. The method of claim 11, wherein establishing a connection to the IMDB comprises accessing the IMDB via a GUI-specific API.

17. The method of claim 11, further comprising:
selecting at least first and second database diagnostic parameters from a plurality of database diagnostic parameters and causing respective first and second database diagnostic scripts to be run in parallel;
processing the output of the first and second database diagnostic scripts together; and
modifying at least a third database diagnostic script based on the output of the first and second database diagnostic script;
executing the modified third database diagnostic script; and
generating a report from the modified third database diagnostic script to be displayed via the GUI.

18. A non-transitory computer program product storing instructions which, when executed by at least one data processor forming part of at least one computing device, perform operations comprising:
establishing a connection to an IMDB (in-memory database) via a GUI (graphical user interface);
automatically detecting an IMDB version of the IMDB;
selecting at least one script from a plurality of scripts based on the detected IMDB version, wherein differences among the plurality of scripts relate to data parameter differences in different IMDB versions; and
causing the selected at least one script to be executed to return data of a type recognized in the detected IMDB version.

19. The program product according to claim 18, wherein establishing a connection to the IMDB via the GUI comprises detecting an open GUI session and automatically opening a command editor.

20. The program product according to claim 18, wherein the operations further comprise:
selecting at least first and second database diagnostic parameters from a plurality of database diagnostic parameters and causing respective first and second database diagnostic scripts to be run in parallel;
processing the output of the first and second database diagnostic scripts together; and
modifying at least a third database diagnostic script based on the output of the first and second database diagnostic script;
executing the modified third database diagnostic script; and
generating a report from the modified third database diagnostic script to be displayed via the GUI.

* * * * *